United States Patent
Lemstra et al.

(10) Patent No.: US 9,205,589 B2
(45) Date of Patent: Dec. 8, 2015

(54) PROCESS FOR PRODUCING HIGH-PERFORMANCE POLYMER FIBERS

(75) Inventors: Pieter Jan Lemstra, Veldhoven (NL); Robert Marc Fifield, Velsen (NL); Altug Altay, Veldhoven (NL)

(73) Assignee: POLYMER RESEARCH & DEVELOPMENT, Veldhoven (NL)

( * ) Notice: Subject to any disclaimer, the term of this patent is extended or adjusted under 35 U.S.C. 154(b) by 365 days.

(21) Appl. No.: 13/877,630

(22) PCT Filed: Oct. 5, 2011

(86) PCT No.: PCT/NL2011/050672
§ 371 (c)(1),
(2), (4) Date: Jun. 3, 2013

(87) PCT Pub. No.: WO2012/047100
PCT Pub. Date: Apr. 12, 2012

(65) Prior Publication Data
US 2013/0241105 A1  Sep. 19, 2013

(30) Foreign Application Priority Data
Oct. 5, 2010 (NL) ..................................... 2005455

(51) Int. Cl.
*D02J 1/22* (2006.01)
*B29C 47/00* (2006.01)
*D01F 6/06* (2006.01)
*D01F 6/30* (2006.01)
*D01F 6/04* (2006.01)
(Continued)

(52) U.S. Cl.
CPC .............. *B29C 47/0014* (2013.01); *D01D 5/06* (2013.01); *D01D 5/12* (2013.01); *D01D 10/02* (2013.01); *D01F 6/04* (2013.01); *D01F 6/06* (2013.01); *D01F 6/14* (2013.01); *D01F 6/30* (2013.01); *D01F 6/62* (2013.01); *D01F 13/04* (2013.01); *D02J 1/222* (2013.01); *D02J 1/228* (2013.01)

(58) Field of Classification Search
CPC .............. D01D 5/06; D01D 5/12; D01F 6/04; D01F 6/06; D01F 6/14; D01F 6/30; D01F 6/62; D01F 13/04; D02J 1/22; D02J 1/222; D02J 1/228
USPC ............ 264/37.18, 37.26, 178 R, 178 F, 184, 264/210.3, 210.4, 210.7, 210.8, 211.14, 264/211.15, 211.17
See application file for complete search history.

(56) References Cited

U.S. PATENT DOCUMENTS 3,896,204 A * 7/1975 Goodman et al. ..... 264/210.8 X
3,925,524 A * 12/1975 Kimmel et al. ........ 264/210.8 X
(Continued)

FOREIGN PATENT DOCUMENTS

CA  2342151 A *  8/2002
EP  0350945     1/1990
(Continued)

*Primary Examiner* — Leo B Tentoni
(74) *Attorney, Agent, or Firm* — Tyler J. Sisk; Casimir Jones, S.C.

(57) ABSTRACT

The present invention relates to a process for the preparation of polymer filaments having a high tensile strength and modulus by extrusion of a solution of a solvent and linear high-molecular weight polymer and subsequent spinning and quenching of the filaments thus formed, wherein after spinning and quenching the as-spun filaments are stretched under contact with steam for removing the solvent from filaments being stretched.

18 Claims, 4 Drawing Sheets

Figure 1:
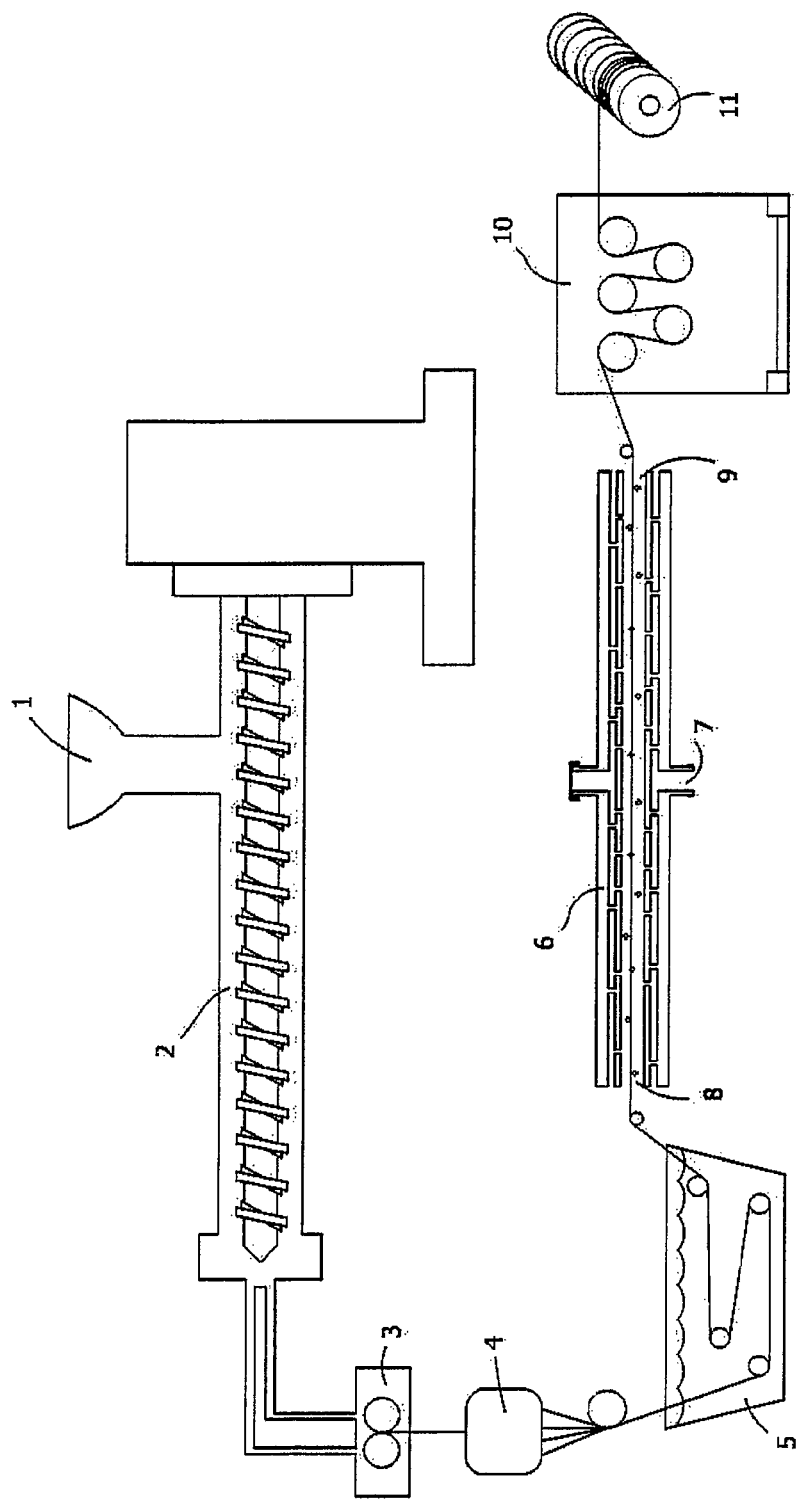

(51) Int. Cl.
  *D01D 5/06* (2006.01)
  *D01F 6/14* (2006.01)
  *D01F 6/62* (2006.01)
  *D01D 5/12* (2006.01)
  *D01D 10/02* (2006.01)
  *D01F 13/04* (2006.01)

(56) References Cited

U.S. PATENT DOCUMENTS

| 4,098,864 | A | * | 7/1978 | Morris et al. | 264/289.3 |
| 4,296,058 | A | * | 10/1981 | Chen et al. | 264/78 |
| 4,371,680 | A | * | 2/1983 | Baxter et al. | 526/159 |
| 4,436,689 | A | * | 3/1984 | Smith et al. | 264/210.8 X |
| 5,082,611 | A | * | 1/1992 | Adams et al. | 264/210.8 X |
| 5,240,566 | A | * | 8/1993 | Hahn et al. | 203/35 |
| 5,246,657 | A |   | 9/1993 | Yagi et al. | |

FOREIGN PATENT DOCUMENTS

| EP | 1985728 | 10/2008 |
| EP | 2080775 | 7/2009 |
| EP | 2625321 | 12/2014 |
| GB | 2018188 | 10/1979 |
| JP | 2004-277937 | 10/2004 |
| WO | 2006/073743 | 7/2006 |
| WO | 2009/043597 | 4/2009 |

\* cited by examiner

PROCESS FOR PRODUCING HIGH-PERFORMANCE POLYMER FIBERS

The present invention relates to a process for producing high-performance polymer fibers.

U.S. Pat. No. 5,246,657 relates a process of making polyolefine fibre in which the drawing of the shaped body of the UHMW olefine resin composition can be carried out at 40° to 160° C. As the heating medium a medium capable of removing the diluent by extraction and having a boiling point higher than that of the composition constituting the shaped body, such as decalin, decane or kerosene, can be used.

European patent application 1 985 728 discloses a process in which a fibre after having been subjected to the step of the plastic stretching bath is then rinsed with cold water, and subsequently, after rinsing with warm water, is subjected to a steam treatment.

British patent application 2 018 188 discloses in examples 1-7 a steam pressurised drawing step following normal stretching, i.e. steam stretching following hot water stretching wherein a three-stage steam tube was employed.

Japanese patent application 2004-277937 relates to the preparation of a meta type wholly aromatic polyamide fibre in which a coagulated yarn is washed with water and drawn in a warm water bath wherein the inorganic salt of the coagulating solution is removed from the resultant fibre in the warm water bath, after which the fibre is drawn with saturated steam.

European patent application 2 080 775 discloses a process for the production of polyacrylonitrile polymer in which any solvent has been removed from the filament prior to steam stretching.

International application WO 2006/073743 discloses a process for spinning high molecular weight poly (alpha-olefin) filament from solution in volatile spinning solvent with recovery and recycling of the solvent.

International application WO 2009/043597 discloses a process for producing gel-spun UHMWPE fibres wherein gel fibres are taken-up into an oven wherein solvent evaporation occurs to form solid fibers.

The term high performance (HP) fibers, refers to fibers possessing a high strength and high stiffness (E-Modulus). Steel (wire) possessing a density of appr. 7800 kg/m$^3$ possesses an E-Modulus of appr. 200 GPa but divided by the density, the specific E-Modulus is low. Similarly, glass fibers possessing a density of appr. 2400 kg/m$^3$ have a low specific stiffness (E-Modulus) and specific strength.

Organic fibers like Kevlar® produced by Du Pont and Twaron® produced by Teijin and the carbon fibers (produced from polyacrylonitrile), possess a lower density. Polyethylene (PE) fibers, indicated as HPPE (high-performance Polyethylene fibers), possess superior specific strength and stiffness due to the low density of PE fibers which is just below 1000 kg/m$^3$, lower than water.

HP-PE fibers are considered at present to be the strongest and stiffest fibers in the world of high-performance fibers based on their high specific values for strength and stiffness.

The main use of HP-PE fibers is in ballistic applications such as bulletproof vests and helmets, other applications include ropes and fishing nets. The main competitor of HP-PE is the aramid fiber, the well-known Kevlar® and Twaron® fibers produced respectively by Du Pont and Teijin (formerly Akzo Nobel) but the main advantage of HP-PE fibers is their low weight (low density) which implies more wear comfort. The USA army will replace Kevlar® by PE fibers in due time (M. Cox and D. Lamothe, Army Times August 2009, vol. 31). HP-PE fibers possess a density just below that of water and, consequently, they float on water (ropes) and possess no weight under water. For deep sea moorings as used for oil rigs this is a very important issue.

In order to obtain high specific values for strength and stiffness not only a low density is a prerequisite (the denominator) but also a high-strength and stiffness (the numerator). For organic fibers such as the aramids and HP-PE the requirement to get high strength and stiffness is that the polymer chains should be oriented in a parallel fashion along the fiber-axis. For the aramid fibers the constituting molecules are so-called rigid chains molecules which easily align themselves during spinning from so-called nematic solutions in which the chains are pre-aligned in domains.

For HP-PE fibers orientation/extension of the individual molecules is much more difficult since these polymer chains are highly flexible and highly entangled with each other and themselves. To explain in simple terms, the aramid molecules are like uncooked spaghetti (rigid chains) and the PE chains are like cooked spaghetti.

The development of HP-PE fibers took a tortuous path. In the 1960s Ward c.s. explored conventional melt-spinning of (linear) polyethylenes followed by (ultra) drawing in order to get oriented molecules in the fibers. Based on this research, attempts have been made to commercialise PE fibers, e.g. by SNIA in Italy but the success was limited, the properties like tensile strength, stiffness and notably the poor resistance to creep of PE fibers combined with an intrinsic low production speed (the drawing step was too slow) were major factors for lack of success.

It was recognized in the scientific world in the 1970s that in order to obtain high-strength/high-Modulus PE fibers, so-called ultra-high molecular weight polyethylene, UHMW-PE, possessing a molar mass >10$^6$ grams/mole, was a prerequisite but these high molar mass are not melt-processable due to a too high melt-viscosity.

At the end of the 1970s, solution-spinning of UHMW-PE was done at DSM Central laboratories (NL) using UHMW-PE and a simple piston to pump a dilute solution of UHMW-PE, typically 1% w.w. in decalin, through an orifice of appr. 1 mm. The extruded filament was quenched into a water bath and a gel-like filament was obtained, viz. only 1% of UHMW-PE polymer and 99% of solvent. Stretching these gel-like filaments at elevated temperatures, but below the dissolution temperature, resulted in UHMW-PE fibres with impressive properties, viz. a strength >3 GPA (>3 N/tex) and an E-Modulus >100 GPa (100 N/tex).

Solution(gel)-spun polyethylene fibers are currently produced commercially and make an inroad in specific applications such as ballistic protection (helmets, bulletproof vests) replacing aramid fibers such as Kevlar®. The base material for high-performance polyethylene (PE) fibers is ultra-high molecular weight PE (UHMW-PE), an intractable polymer in view of its high molar mass, >10$^6$ gram/mole, which makes melt-processing impossible. The term solution(gel)-spinning is misleading because UHMW-PE is spun from a true solution and gels are formed upon quenching the as-spun filaments which consists of 90% or more solvent. Upon quenching, the UHMW-PE crystallizes and the as-spun filaments become gelly-like. The essential feature is that upon dissolution of UHMW-PE, the very long chain molecules become dis-entangled from each other and this dis-entangled state is preserved in the as-spun filaments promoting ultra-drawing, even after removal of the solvent before the drawing process. The major disadvantage of these solution(gel)-spinning processes is that a large amount of solvent is needed, 90% or more, which has to be recovered fully.

The main disadvantage of producing HP-PE fibers is the use of the large amount of solvent that is needed to make a) UHMW-PE processable (lower the viscosity) and b) to generate the so-called disentangled precursor (as-spun filaments) in order to obtain sufficient drawability during stretching the as-spun fibers.

As disclosed in for example U.S. Pat. No. 4,436,689 a suspension of UHMW-PE in a solvent is fed into a twin-screw extruder and the solution is made in the extruder by heating. The solution is spun via a metering pump and spinneret into a quench bath and subsequently the as-spun fibers are drawn in an oven at elevated temperatures to obtain oriented PE molecules and to remove the solvent.

The process can be modified in several ways but basically what is needed is a solvent with a low UHMW-PE concentration, up to 10%, to generate the high drawability needed for chain alignment upon draw.

In the aforementioned processes the solvent decalin is used. Decalin is a very good solvent for PE but is also inflammable and potentially explosive. Consequently, the solvent decalin must be recovered from the fibers during draw in the oven which includes nitrogen "blankets" and other safety measures which makes the production of Dyneema® expensive.

Some manufacturers use paraffinic oils but the problem is to remove this oil from the fibers. The as-spun UHMW-PE filaments are usually collected in containers and subsequently extracted using a volatile solvent (often by hand) and then fed into an oven for drawing. This procedure is seemingly more economically in countries with low labour costs but the drawback is that oil is difficult to remove fully and residual oil favours creep of these fibers.

The object of the present invention is to provide an economical, environmental and safe route for producing polymer filaments having high tensile strength and modulus.

Another object of the present invention is to provide a process for producing polymer filaments having high tensile strength and modulus wherein the filaments thus produced have a circular cross sectional area. However, the present invention is not restricted to filaments as such, but fiber and tape structure are also relevant structures for the present invention.

Yet another object of the present invention is to provide a process for producing polymer filaments having high tensile strength and modulus wherein the solvent used during the extrusion can be easily recovered and re-used.

The present invention relates a process for the preparation of polymer filaments having a high tensile strength and modulus by extrusion of a solution of a solvent and linear high-molecular weight polymer and subsequent spinning and quenching of the filaments thus formed and is characterized in that after spinning and quenching the as-spun filaments are stretched under contact with steam for removing the solvent from filaments being stretched.

The present inventors found that during stretching the polymer molecules are oriented into a parallel crystalline register and that there is no room for solvent molecules between the polymer molecules in the thus aligned filaments. Consequently, the solvent will appear at the outer surface of the aligned filaments. The effect of steam is that the steam will carry away the solvent resulting in the removal of solvent from the filaments in a very effective way. After cooling and condensation a system of solvent and water will be obtained. In addition, steam is a very efficient heat transfer medium. Furthermore, there is no risk of explosion and/or fire. The solvent can be re-used after recovery in the process. The use of steam in the present invention can not be confused with the use of hot air only. The present method clearly focusses on the use of steam during the stretching phase after the quenching phase, in which stretching phase the use of steam is critical, which use cannot be replaced by the use of hot air. Therefore, the present stretching phase cannot be carried out in a hot environment, i.e. hot air, but needs the presence of steam. According to the present invention steam is used to remove the majority of the solvent. In a situation in which some residual solvent remains after said steam treatment it is possible to remove the last traces of solvent in an oven.

According to a preferred embodiment the solvent and steam are not miscible, wherein especially the solvent has a boiling point of >100° C. Preferred embodiments of solvents are xylene, decalin, tetralin, but other ssuitable solvents are aliphatic, cycloaliphatic, and aromatic hydrocarbons having boiling points of at least 100° C., such as octane, nonane, decane, or isomers thereof, and higher straight or branched hydrocarbons, petroleum fractions with boiling ranges above 100° C., toluenes or xylenes, naphthalene, hydrogenated derivatives thereof, and also halogenated hydrocarbons and other solvents known in the art. With a view toward low cost, preference will usually be given to non-substituted hydrocarbons, including hydrogenated derivatives of aromatic hydrocarbons. By using a solvent being not miscible with steam it is possible to wipe away the solvent that appears on the surface of the filaments during the stretching phase carried out in the presence of steam. The use of such a non-miscible solvent having a boiling point of >100° C. under atmospheric conditions, or even under the conditions that prevail in the interior of the steam tube, is preferred because the solvent will maintain itself as a solvent, i.e. no transfer to a gas phase. The solvent can be recovered from a two phase mixture of water and solvent by conventional methods.

The steam temperature and pressure are set at the desired range for stretching, i.e. in a range of from 120-150° C.

It is preferred that said contact with steam and the filaments during stretching is such that filaments entering the area where stretching takes place encounter a lower steam temperature than filaments leaving said area. This will have a beneficial effect on the final filaments after stretching.

For economical and technical reasons it is possible that said solvent after stretching is recovered, wherein the recovered solvent is re-used as solvent in the process for the preparation of polymer filaments.

If necessary for conditioning the filaments its is possible that after stretching the filaments the thus stretched filaments undergo a post drawing step, especially that said post drawing step is carried out in an oven at high temperature. On of the benefits of the present method is that during stretching the filaments there is no contact between said filaments and rollers.

According to a preferred embodiments said stretching takes place in an elongated tube, wherein said tube comprises a perforated inner tube and an outer tube surrounding the inner tube, the annular area between the said inner tube and said outer tube being used for steam introduction, wherein said contact between said steam and said filaments takes place via said steam passing through the perforations present in the inner tube. The term "tube" as used here is not restricted to a cilindrical or circular shape but any shape like rectangular or triangular can be applied, especially a shape in which the as-spun fibers can be brought in contact with steam, wherein the polymeric material is transported from the inlet to the outlet of the tube in the presence of steam for removing the solvent from the polymeric material. This means that the stretching can also take place in an elongated box, i.e. a rectangular structure. In a preferred embodiment such an elongated box is provided with a lid enabling access to the as-spun fibers. Such a lid can easily be opened and closed for inspection of the polymeric material, or for maintenance purposes.

In a specific embodiment it is possible that the introduction of steam into said annular area takes place at several positions along the length of the elongated tube.

Furthermore, several elongated tubes can be placed in series so that the filaments undergo several stretching steps. In such a case the steam conditions in said elongated tubes may differ from each other. Additionally, it is preferred that several elongated tubes are placed in series, wherein in a special embodiment one or more ovens are placed between said elongated tubes, in which ovens preferably a drawing step is carried out.

The present invention is not restricted to high-molecular weight polyethylene but high-molecular weight polypropylene, ethylene-propylene copolymers, polyethyleneoxide, polyesters, and polyvinylalcohol can be processed according to the present invention as well.

The filaments prepared in accordance with this invention are suitable for a variety of applications. They can be used as reinforcement in a variety of materials for which reinforcement with fibers or filaments is known, for tire cords, and for all applications in which low weight combined with high strength is desired, such as rope, nets, filter cloths, and the like, such as fishing lines and fishing nets, ground nets, cargo nets and curtains, kite lines, dental floss, tennis racquet strings, canvas (e.g. tent canvas), nonwoven cloths and other types of fabrics, webbings, battery separators, capacitors, pressure vessels, hoses, automotive equipment, power transmission belts, building construction materials, cut and stab resistant and incision resistant articles, protective gloves, composite sports equipment such as skis, helmets, kayaks, canoes, bicycles and boat hulls and spars, speaker cones, high performance electrical insulation, radomes, and the like.

The present invention will be explained in detail but the specific examples do not restrict the scope of protection.

FIG. 1 discloses schematically the process according to the present invention.

Figure 2:
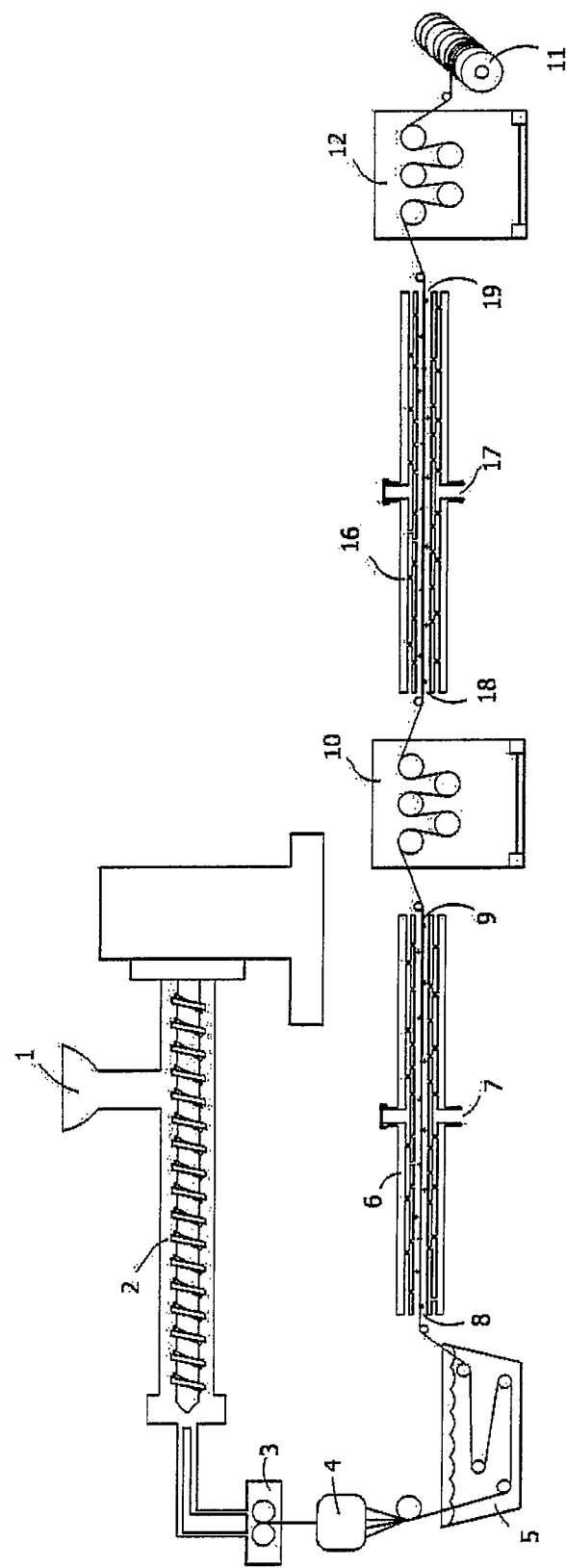

FIG. 2 discloses schematically a preferred embodiment of the process according to the present invention.

Figure 3:
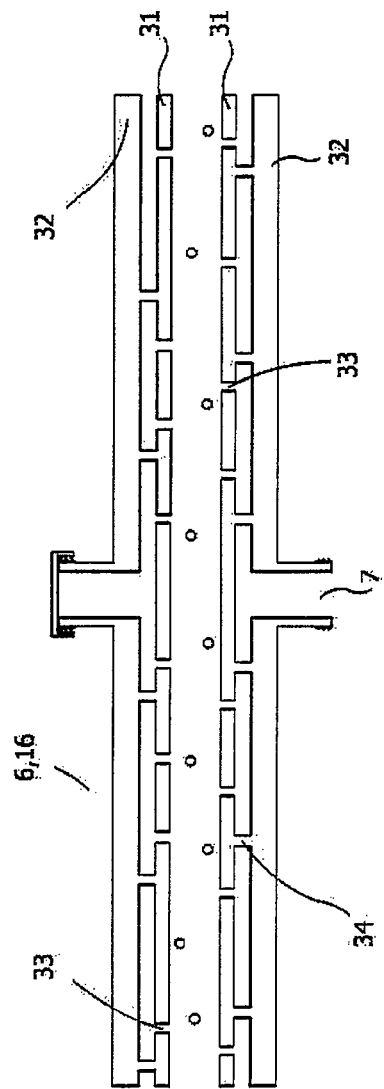
Figure 3:
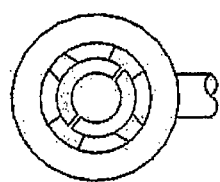

FIG. 3 discloses schematically the steam tube used in the present invention.

Figure 4:
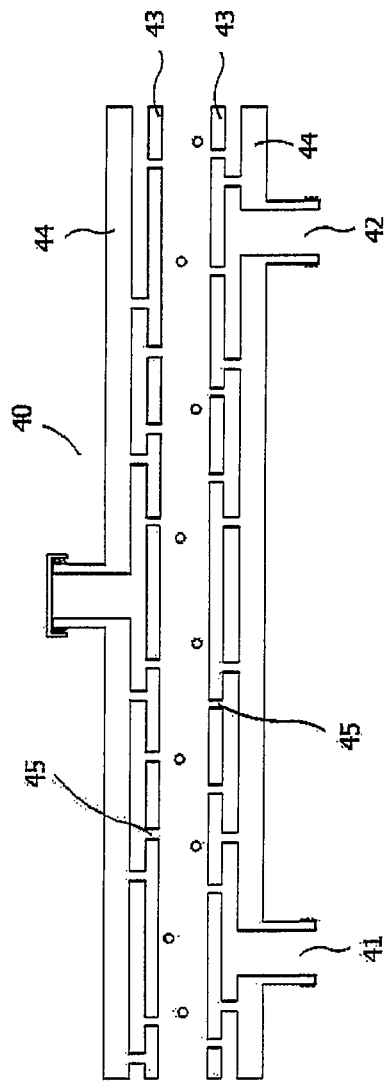
Figure 4:
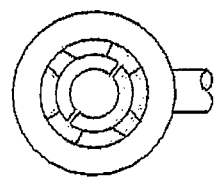

FIG. 4 discloses schematically a preferred embodiment of the steam tube used in the present invention.

In FIG. 1 a suspension of polymer, e.g. UHMW-PE in a solvent, indicated with reference number 1, is fed into a twin-screw extruder 2 and the solution is made in the extruder by heating. The solution is spun via a metering pump 3 and spinneret 4 into a quench bath 5 and subsequently the as-spun fibers are brought into contact with steam in tube 6. The steam enters tube 6 at point 7, whereas the filaments leaving the quench bath 5 enters the steam tube at point 8. Although point 7 is located somewhere in the middle of tube 6, the present invention is not restricted to that specific location of the steam entrance point, i.e. point 7 can be located at the outlet of tube 6, or even a plurality of points 7 can be located along the length of tube 6. The steam thus entered in tube 6 comes into contact with the filaments. After traveling through the interior of the steam tube 6 the filaments leave the steam tube at point 9. If necessary, the steam treated filaments are drawn in an oven 10 at elevated temperatures through the use of heated rollers to obtain oriented PE molecules and to additionally remove any of the solvent left. The final fibre is collected on roll 11. The solvent is recovered from tube 6. In this process several locations of rollers have been disclosed but the figure as such is schematically. It is preferred that there are no rollers present during the stretching phase, i.e. in the interior of the steam tube 6. Although not shown in FIG. 1, an additional or preliminary step of removal of solvent, for example a mechanical removal step, between quench bath 5 and steam tube 6 is possible, if necessary.

FIG. 2 is a preferred embodiment of the process disclosed in FIG. 1. The embodiment disclosed in FIG. 2 will be used to obtain even better oriented polymer molecules. In all FIGS. 2-4 the same reference numbers apply for the same equipment. An essential difference is that according to the process disclosed in FIG. 2 the stretching phase takes place in two steam tubes 6, 16 placed in series. The as-spun fibers are brought into contact with steam in the interior of first steam tube 6 and undergo a intermediate drawing step in oven 10 under elevated temperature. After such an intermediate drawing step the remaining part of the solvent, if any, is removed in the interior of second steam tube 16. The filaments thus treated enter into second steam tube at point 18 and leave the second steam tube 16 at point 19. Steam enters in second steam tube 16 at point 17. Although not shown here, steam may be introduced at several ports along the length of steam tube 6, 16 and under different steam conditions, if necessary. If necessary, the steam treated filaments are additionally drawn in an oven 12 at elevated temperatures to obtain oriented PE molecules on a roll 11. The aforementioned elevated temperatures are realized by the application of so-called heated rollers. Those heated rollers provide a post-stretch resulting in better oriented polymer molecules and better properties, consequently. It is preferred that there are no rollers present during both two stretching phases, i.e. in the interior of first steam tube 6 and second steam tube 16. The process according to FIG. 2 is preferred when a solvent having a relatively high boiling point is used. Although not shown in FIG. 2, the as-spun fibers can undergo a preliminary step for the removal of any solvent from the as-spun fibers before entering steam tube 6, for example by mechanical removal of solvent. In addition, FIG. 2 only discloses a series of two steam tubes 6, 16 but any number of steam tubes can be used, placed in series or even in a parallel configuration.

FIG. 3 schematically shows a steam tube 6,16, i.e. an elongated tube, wherein said tube 6,16 comprises a perforated inner tube 31 and an outer tube 32 surrounding the inner tube 31, the annular area between the said inner tube 31 and said outer tube 32 being used for steam introduction through port 7, wherein said contact between said steam and said filaments (not shown) in the interior of steam tube 6, 16 takes place via said steam passing through the perforations 33 present in the inner tube 31. Inner tube 31 is connected to outer tube 32 via baffles 34. During the present stretching phase said filaments travel from the inlet of steam tube 6, 16 to the outlet of steam tube 6, 16 and the filaments are only present in the interior of inner tube 31.

FIG. 4 schematically shows a preferred embodiment regarding the introduction of steam into said annular area. The introduction of steam is at two distinct places, i.e. at port 41 and port 42. Elongated tube 40 comprises a perforated inner tube 43 and an outer tube 44 surrounding the inner tube 43, the annular area between the said inner tube 43 and said outer tube 44 being used for steam introduction through ports 41, 42, wherein said contact between said steam and said filaments (not shown) takes place via said steam passing through the perforations 45 present in the inner tube 43. In practice, two different inlet ports for steam introduction are used for creating different steam conditions, i.e. temperature, in the interior of the steam tube 40. In another embodiment (not shown) even more than two steam introduction points are possible along the length of the elongated steam tube.

Example 1

A suspension of 7% w./w. of UHMW-PE possessing a molar mass, $M_w$ appr. $3.5 \times 10^6$ gram/mole, in decalin, and containing 1% w./w. based on polymer of an anti-oxidant (Irganox) was fed into a twin-screw extruder. The extruder configuration was: L/D=40, diameter 30 mm and containing some mixing elements in a transport mode, temperature 165° C. During extrusion a homogeneous solution was obtained which was fed into a metering pump and spinneret. The obtained multi-filaments were quenched into a waterbath at ambient temperature. The quenched, gelly-like, filaments were fed into one single steam tube and the roller speeds in the quench bath and at the exit of the steam tube were set to obtain a total draw ratio of 20. Steam was fed into the steam tube with a temperature of 150° C. The drawn UHMW-PE fibers were solvent free and possessed a strength >2 GPa and an E-Modulus of appr. 50 Gpa. The amount of decalin removed from the fibers is >99% by weight.

Example 2

A suspension of 7% w./w. of UHMW-PE possessing a molar mass, $M_w$ appr. $3.5 \times 10^6$ gram/mole, in decalin, and containing 1% w./w. based on polymer of an anti-oxidant (Irganox) was fed into a twin-screw extruder. The extruder configuration was: L/D=40, diameter 30 mm and containing some mixing elements in a transport mode, temperature 165° C. During extrusion a homogeneous solution was obtained which was fed into a metering pump and spinneret. The obtained multi-filaments were quenched into a waterbath at ambient temperature. The quenched, gelly-like, filaments were fed into a first steam tube and the roller speeds in the quench bath and at the exit of the first steam tube were set to obtain a draw ratio of 10-15 (first draw) and then into a second steam tube with a draw ratio of 5. Steam was fed into the first and second steam tubes with a temperature of respectively 120 and 150° C. The drawn UHMW-PE fibers were solvent free and possessed a strength >3 GPa and an E-Modulus of appr. 100 GPa. The amount of decalin removed from the fibers is >99% by weight.

Example 3

A suspension of 5% w./w. of UHMW-PE possessing a molar mass, $M_w$ appr. $5 \times 10^6$ gram/mole, in xylene, and containing 1% w./w. based on polymer of an anti-oxidant (Irganox) was fed into a twin-screw extruder. The extruder configuration was: L/D=40, diameter 30 mm and containing some mixing elements in a transport mode, temperature 130° C. During extrusion a homogeneous solution was obtained which was fed into a metering pump and spinneret. The obtained multi-filaments were quenched into a waterbath at ambient temperature. The quenched, gelly-like, filaments were fed into one single steam tube and the roller speeds in the quench bath and at the exit of the steam tube were set to obtain a draw ratio of 10-15. Steam was fed into the tube at two entry points with a temperature of respectively 120 and 135° C. The lower steam temperature at the entrance of the steam tube and the higher steam temperature at the exit of the steam tube. The drawn UHMW-PE fibers were subsequently drawn on heated rollers in a T-gradient of 130-150° C. The PE fibers possessed a strength >3 GPa and an E-Modulus of appr. 130 GPa. The amount of xylene removed from the fibers is >99% by weight, i.e. nearly 100% by weight.

Example 4

A suspension of 7% w./w. of UHMW-PP possessing a molar mass, $M_w$ appr. $3 \times 10^6$ gram/mole, in decaline, and containing 1% w./w. based on polymer of an anti-oxidant (Irganox) was fed into a twin-screw extruder. The extruder configuration was: L/D=40, diameter 30 mm and containing some mixing elements in a transport mode, temperature 150° C. During extrusion a homogeneous solution was obtained which was fed into a metering pump and spinneret. The obtained multi-filaments were quenched into a waterbath at appr. 0° C. The quenched, gelly-like, filaments were fed into one single multi entry port steam tube and the roller speeds in the quench bath and at the exit of the steam tube were set to obtain a draw ratio of 10-15. Steam was fed into the steam tube at two entry points with a temperature of respectively 120 (at the entrance of the steam tube) and 135° C. (near the end of the steam tube). The drawn UHMW-PP fibers were subsequently drawn on heated rollers in a T-gradient of 150-180° C. The PP fibers possessed a strength >1.5 GPa and an E-Modulus of appr. 30 Gpa. The amount of decalin removed from the fibers is >99% by weight.

Example 5

A suspension of polyhydroxybutyrate (PHB) copolymer powder (the comonomer was hydroxyvalereate, appr. 4%), possessing a molecular weight of 1.5 million gram/mole, in dichloromethane, $CH_2Cl_2$, was fed into a twin-screw extruder. The extruder configuration was 25 L/D; diameter 30 mm. During extrusion a homogeneous solution was obtained which was fed into a metering pump and spinneret. The obtained multi-filaments were quenched into a water/ice mixture bath at appr. 0° C. The quenched, gelly-like, filaments were passed to an extraction bath containing methanol to remove the majority (>50%) of the solvent dichloromethane by extraction and to get sufficient strength of the fibers to be fed into the steam tube. Then the PHB filaments containing a minority of solvent were fed into the steam tube at two entry points with a temperature of respectively 100° C. (at the entrance of the steam tube) and 120° C. (near the end of the steam tube) and an adjusted overall draw ratio of 15. This method proved to remove the non-miscible (with water) solvent dichloromethane efficiently during steam stretching and producing low denier PHB fibers. The amount of dichloromethane removed from the fibers is >99% by weight.

The above examples clearly show that the stretching step under the influence of steam after spinning and quenching of the filaments has a positive effect on removing any solvent from the filaments. The presence of steam will remove the solvent present on the outer surface of the filaments. Due to the immiscibility of both steam and solvent, the solvent can be recovered very easily and re-used in the process.

The invention claimed is:
1. A process for the preparation of polymer filaments having a high tensile strength and modulus comprising:
   a) extrusion of a solution of a solvent and linear high-molecular weight polymer;
   b) spinning and quenching of filaments formed in step (a); and
   c) stretching the as-spun filaments under contact with steam thereby removing the solvent from the filaments.

2. The process according to claim 1, wherein the solvent and steam are not miscible.

3. The process according to claim 2, wherein the solvent has a boiling point of >100° C. at atmospheric pressure.

4. The process according to claim 1, wherein the steam temperature is between 120-150° C. and the pressure is atmospheric pressure.

5. The process according to claim 1, wherein contact with steam and the filaments during stretching occurs under conditions such that filaments entering the area where stretching takes place encounter a lower steam temperature than filaments leaving the area.

6. The process according to claim 1, wherein the solvent removed during stretching is recovered.

7. The process according to claim 6, wherein the recovered solvent is re-used as solvent in the process for the preparation of polymer filaments.

8. The process according to claim 1, wherein the stretched filaments undergo a post drawing step.

9. The process according to claim 8, wherein the post drawing step is carried out in an oven at a temperature above 130° C.

10. The process according to claim 1, wherein during stretching the filaments there is no contact between filaments and rollers.

11. The process according to claim 1, wherein stretching takes place in an elongated tube, wherein the tube comprises a perforated inner tube and an outer tube surrounding the inner tube, the annular area between the inner tube and the outer tube being used for steam introduction, wherein the contact between the steam and the filaments takes place via the steam passing through the perforations present in the inner tube.

12. The process according to claim 11, wherein the introduction of steam into the annular area takes place at several positions along the length of the elongated tube.

13. The process according to claim 11, wherein several elongated tubes are placed in series so that the filaments undergo several stretching steps.

14. The process according to claim 13, wherein the steam conditions in each of the several elongated tubes differ from each other.

15. The process according to claim 13, wherein one or more ovens are placed between the elongated tubes, wherein a drawing step is carried out in the one or more ovens.

16. The process according to claim 1, wherein the linear high-molecular weight polymer is selected from the group consisting of polyethylene, polypropylene, ethylene-propylene copolymers, polyethyleneoxide, polyesters, and polyvinylalcohol.

17. The process according to claim 16, wherein the linear high-molecular weight polymer is polyethylene.

18. The process according to claim 16, wherein the linear high-molecular weight polymer is polypropylene.

* * * * *